(12) United States Patent
Friesen et al.

(10) Patent No.: US 11,989,312 B2
(45) Date of Patent: May 21, 2024

(54) METHOD FOR TRANSMITTING INFORMATION

(71) Applicant: DAIMLER AG, Stuttgart (DE)

(72) Inventors: Viktor Friesen, Karlsruhe (DE); Micha Koller, Pliezhausen (DE); Hubert Rehborn, Sindelfingen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 290 days.

(21) Appl. No.: 17/596,020

(22) PCT Filed: May 11, 2020

(86) PCT No.: PCT/EP2020/062967
§ 371 (c)(1),
(2) Date: Dec. 2, 2021

(87) PCT Pub. No.: WO2020/244887
PCT Pub. Date: Dec. 10, 2020

(65) Prior Publication Data
US 2022/0300623 A1 Sep. 22, 2022

(30) Foreign Application Priority Data
Jun. 3, 2019 (DE) ...................... 10 2019 003 893.2

(51) Int. Cl.
*G06F 21/60* (2013.01)
*G07C 5/00* (2006.01)
(Continued)

(52) U.S. Cl.
CPC ........... *G06F 21/602* (2013.01); *G07C 5/008* (2013.01); *G07C 5/08* (2013.01); *H04L 67/12* (2013.01); *G06F 2221/2113* (2013.01)

(58) Field of Classification Search
CPC ....... G06F 21/60–64; G06F 2221/2113; G06F 2221/2107; G07C 5/008; H04W 12/00–80
See application file for complete search history.

(56) References Cited

U.S. PATENT DOCUMENTS

2005/0165886 A1 7/2005 Tuer et al.
2014/0325236 A1* 10/2014 Kim .................... G06F 21/62
713/189

(Continued)

FOREIGN PATENT DOCUMENTS

DE 102017216936 A1 3/2019

OTHER PUBLICATIONS

A. Demba and D. P. F. Möller, "Vehicle-to-Vehicle Communication Technology," 2018 IEEE International Conference on Electro/Information Technology (EIT), Rochester, MI, USA, 2018, pp. 0459-0464, doi: 10.1109/EIT.2018.8500189. (Year: 2018).*

(Continued)

*Primary Examiner* — Madhuri R Herzog
(74) *Attorney, Agent, or Firm* — PATENT PORTFOLIO BUILDERS PLLC

(57) ABSTRACT

A method for transmitting information between a data processing system external to the vehicle and systems using the information in a vehicle employs integrity protection and/or encryption mechanisms. The integrity and/or encryption mechanisms are used with different levels of protection, wherein the level of protection is selected and/or adjusted based on the information or a classification of the information, the provided use of the information, the state of the vehicle, the surroundings of the vehicle, the origin of the information, the protection goal, and/or the resource consumption.

12 Claims, 1 Drawing Sheet

Figure 1:
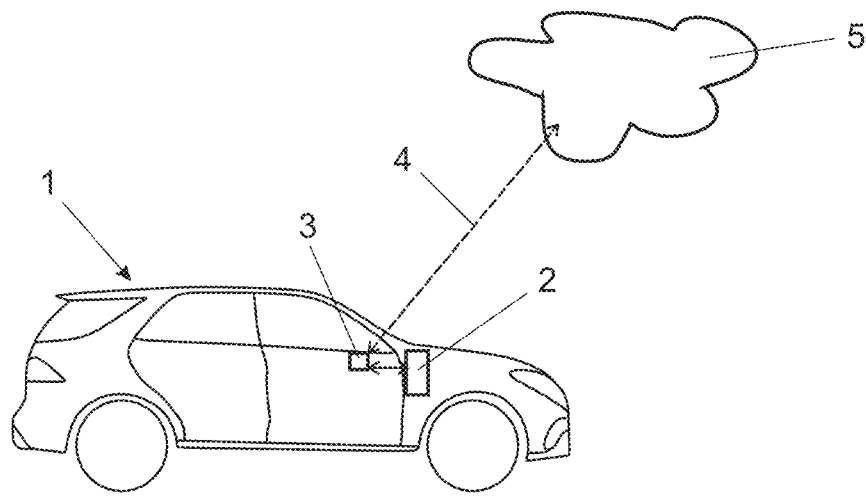

(51) Int. Cl.
G07C 5/08  (2006.01)
H04L 67/12  (2022.01)

(56) References Cited

U.S. PATENT DOCUMENTS

2016/0127385 A1*  5/2016  Struik ................. H04L 63/0428
                                                                   713/170
2017/0270305 A1   9/2017  Kodama et al.
2018/0255562 A1   9/2018  Cho et al.

OTHER PUBLICATIONS

International Search Report mailed Aug. 14, 2020 in related/corresponding International Application No. PCT/EP2020/062967.
Office Action created Feb. 27, 2020 in related/corresponding DE Application No. 10 2019 003 893.2.
Written Opinion mailed Aug. 14, 2020 in related/corresponding International Application No. PCT/EP2020/062967.

* cited by examiner

METHOD FOR TRANSMITTING INFORMATION

BACKGROUND AND SUMMARY OF THE INVENTION

Exemplary embodiments of the invention relate to a method for transmitting information between a data processing system external to the vehicle and systems using the data in a vehicle.

In principle, it is known from the prior art that information and data for controlling functions are exchanged between a data processing system external to the vehicle, for example a so-called backend server, of a vehicle manufacturer or service provider and systems in a vehicle. Here, the transmitted information can have different contents and can, for example, be information relevant to the control and navigation of the vehicle, for example information of a traffic service provider. This can include, for example, information about map data in the surroundings of the vehicle position, but also current information, for example about the traffic flow, weather information or similar.

In this context, DE 10 2017 216 936 A1 describes a security system for vehicle communication. Here, information is also exchanged between a vehicle or systems in the vehicle and a backend server. Here, the core of the disclosure is formed by a method that ultimately serves to obscure the exact destination, such that this is not accessible to third parties. In practice, this has the disadvantage that, in the method described in which information is no longer exchanged in the proximity of the destination, there is always the danger that the user is affected by potential disadvantages when they are not familiar with the region and is "abandoned" by their navigation system in a crucial phase.

An alternative for implementing a corresponding degree of security of the transmitted data can be, for example, an integrity protection and/or an encryption. Such measures for integrity protection or for encryption of the transmitted information can ensure that the information reliably comes from the specified source and is not tampered with and/or that the information, with an encryption, cannot be seen by third parties.

Safeguarding the transmitted information between a data processing system external to the vehicle and the vehicle or the systems using the information in the vehicle via conventional internet technology, such as TLS (Transport Layer Security), for example, are typically not sufficient, such that an end-to-end safeguarding of the message is necessary from the source to the end user in the vehicle, i.e., typically a control device in the vehicle, when a corresponding integrity protection and/or encryption mechanism is to be used. In practice, it is such that different protection levels can be achieved using such mechanisms. Depending on the level of protection, the data are encrypted to different degrees and/or are provided with different degrees of integrity protection. This leads to a greater amount of data having to be transmitted with a higher level of protection, since the keys used are typically longer. In practice, this leads to a very high degree of data consumption. In order to now not have to encrypt all information with the highest protection and thus to keep the data consumption "reasonable", it is often common in practice to accept a compromise here. However, this means that some of the information is encrypted with exactly the correct level of protection, yet other information with a level of protection that is too low or even too high, such that here a security problem, on one hand, and an unnecessarily high consumption of transport resources for transmitting the data, on the other hand, occurs. Both are disadvantageous in practice.

Exemplary embodiments of the present invention are directed to an improved method for transmitting information between a data processing system external to the vehicle and the systems using the information in a vehicle which, by using integrity protection and/or encryption mechanisms, ensures a sufficiently high degree of security based on the case with minimal resource consumption.

In the method according to the invention, it is such that the integrity protection and/or encryption mechanisms are used with a different level of protection, wherein the level of protection is selected and/or adjusted by means of different parameters. The corresponding parameters can here comprise one or more of the aspects discussed below.

This is, on one hand, the information itself or a classification of the information. Different pieces of information are thus correspondingly classified depending on the information itself that can be assessed by means of the information or, in particular, by means of a classification of this information. Only "important" information is treated with a high level of protection, relatively "unimportant" information, which can cause hardly any damage in the event of potential tampering, is transmitted without or with a correspondingly low level of protection.

A further aspect that can be alternatively or additional taken into consideration is the predetermined use of the information. If the information thus serves, for example, to display something, a lower level of protection is conceivable than when the information is used in order to directly access an actuating system in the vehicle, for example to decelerate the vehicle or to steer or accelerate it or similar as part of a driver assistance system.

Furthermore, data of the vehicle itself can be taken into consideration when selecting or adjusting the level of protection. This can be, for example, the state of the vehicle, i.e., the vehicle is in a stable or an unstable state, for example. The surroundings of the vehicle can also be taken into consideration here, for example which traffic phase the vehicle is in, i.e., it is in a traffic jam or correspondingly travels along with the flowing traffic.

A further parameter that can be used to select and adjust the level of protection is the origin of the information. Depending on the origin of the information, a corresponding service for processing the information can establish how trustworthy the information is or whether information with this origin is optionally provided with a higher degree of risk of tampering. This can also be used in order to achieve the reproduction of the information with the correspondingly selected and/or adjusted level of protection. The protected target of the information is also a parameter that can be taken into consideration when it comes to the adjustment or estimation of the level of protection. A protected target is to be understood in the context of the present invention as to whether the integrity of the information, for example, is to be ensured, its authenticity, its confidentiality, or whether it is to document that the information has arrived, such that this cannot be later disputed, or similar. All this can also be used in order to correspondingly adjust or select the level of protection.

A further final aspect that can be taken into consideration alternatively or in addition to the previous parameters when selecting or adjusting the level of protection, is ultimately resource consumption. In particular in relation to the current position, the currently established communication connection, for example, can be correspondingly estimated. If, due to the connection, the transmission is only possible with a lower level of protection than actually requested, it can still be decided whether this is acceptable due to the relevance of the information with the existing resource offer, or whether the message or information should be transmitted at all before it is transmitted on an insufficiently secured path, if the current resources do not allow this.

A very advantageous development of the method according to the invention provides that the integrity protection and/or encryption mechanisms are used in the categories of a low, medium, and high level of protection and no level of protection. This simple categorization into three different levels of protection, and avoiding protection altogether, is typically sufficient in practice in order to ensure, on one hand, a sufficiently secured communication if necessary and, on the other hand, to minimize the use of resources as best as possible. With a low level of protection, exemplary allocations for integrity protection mechanisms to the level of protection could be a symmetrical integrity protection (e.g., HMAC) with a quick or rather less secure hash method (e.g., SHA-1) and a common symmetrical key, a so-called shared key. An example of a medium level of protection could be an asymmetrical integrity protection (e.g., ECC) with a short key, for example Brainpool 160 bit. A high integrity protection could be a comparable asymmetrical integrity protection with a corresponding longer key, for example Brainpool 265 bit.

A very favorable design of the method according to the invention further provides that a high level of protection is predetermined in all cases for information that relates to assistance functions of the vehicle. This information, which directly engages in the assistance function of the vehicle and steers, accelerates, or decelerates the vehicle or brings it to a standstill, for example, or similar are always to be provided with the highest level of protection, since in the case of tampering with this data, there is the crucial danger that the assistance systems of the vehicle carry out functions which impede the safety of the vehicle and the person inside it, such that, with such information, the highest available level of protection is always predetermined.

In order to now also brace for possible tampering on the part of the vehicle, it can be provided according to a very advantageous design of the method according to the invention that the systems internal to the vehicle discard all information having a level of protection that is lower than they would have to be to correspond to the specifications. The vehicle ultimately thus only accepts information corresponding to the predetermined level of protection that is to be expected for the information in the current situation, in order to ensure that potentially tampered data or data with a low level of protection, such that a potential tampering would be conceivable in principle, are not used. A very advantageous development of this idea here provides that a return of the vehicle or its systems to the data processing system external to the vehicle is carried out via discarded information, such that a potential tampering or the danger of such can be recognized in good time via a corresponding evaluation of the external data processing system.

According to a further very advantageous design of the method according to the invention, it is moreover provided that classifications predetermined by an information provider are taken into consideration when selecting and/or adjusting the level of protection. If an information provider, for example the provider of traffic information, predetermines a corresponding categorization, for example breaking news, then this can be provided with a correspondingly higher level of protection than a normal traffic notification. Thus, it is ensured, for example, that there is a warning of an accident, of objects in the driving lane or a wrong-way driver with a correspondingly higher level of protection than, e.g., of stop-go traffic on a route selected by a navigation system of the vehicle.

According to a very advantageous development of the method, the parameters from the surroundings of the vehicle, which can be taken into consideration inter alia for adjusting and selecting the level of protection, are surroundings data detected via surroundings sensors of the vehicle in the immediate surroundings of the vehicle. They further comprise surroundings data present at a greater spatial distance from the vehicle, i.e., at a greater distance than can be typically recorded by the surroundings sensors, the surroundings data being generated by means of transmitted information. Thus, the traffic situation, for example, in the immediate surroundings of the vehicle can be recorded via surroundings sensors and can be forwarded on to the central data processing system external to the vehicle via the communication path, in order to here correspondingly influence the level of protection. Furthermore, further information present in the surroundings, which is, however, not to be recorded by the surroundings sensors, for example a traffic jam which the vehicle can expect in a few kilometers, can be taken into consideration.

A further very advantageous design of the method according to the invention provides that results in the surroundings at greater spatial distance are evaluated by means of the spatial and/or temporal distance of the vehicle to the result relating to their influence on the level of protection. If such a result is information about a wrong-way driver on the route which the vehicle is covering, then it is crucial whether this is at a distance in relation to the vehicle relatively close in front of the vehicle, i.e., in the region of less than 5 kilometers or, for example, 5 minutes journey time, or at a greater distance of, for example, 50 kilometers or 30 minutes journey time. Depending on how this relative spatial and/or temporal ranking of the vehicle and the result in relation to one another is carried out, a correspondingly different level of protection must be used in order to be able to securely and reliably provide the data in the vehicle and to do so with integrity.

An exceptionally favorable development of the method according to the invention further provides that the levels of protection used for the respective transmissions of the information are stored in the data processing system external to the vehicle and are evaluated at least in terms of the occurrence of a temporal and/or spatial accumulation, in order to correspondingly improve the adjustment and allocation. Here, a simple example could be the fact that various vehicles are warned of a certain event. A disproportionately large number of vehicles are warned on the highest level of protection because they are relatively close to the event, while very few vehicles are warned on a medium level of protection because they are correspondingly spaced further apart from the corresponding event. However, it can optionally be shown from the statistical evaluation that the limit at which it is "switched" between the high and medium level of protection is unfavorable and thus an unnecessarily high resource consumption is present. A vehicle in a traffic jam two kilometers away from the accident no longer has to be warned of the accident, for example, on the highest level of protection. Thus, the allocation and adjustment of the level of protection can be optimized by means of a corresponding adjustment of the limit by means of the statistical data, which are reregistered and evaluated in the typically central data processor external to the vehicle.

The method according to the invention is suitable for different kinds of data and information which are to be transmitted. In particular, it is suitable for transmitting information of a traffic service and would thus preferably, yet not restrictively, settle in the region of the navigation systems and the dynamic transmission of traffic information.

Further advantageous designs of the method according to the invention also emerge from the exemplary embodiment, which is described below by way of example with reference to the figures.

BRIEF DESCRIPTION OF THE DRAWING FIGURES

Figure 2:
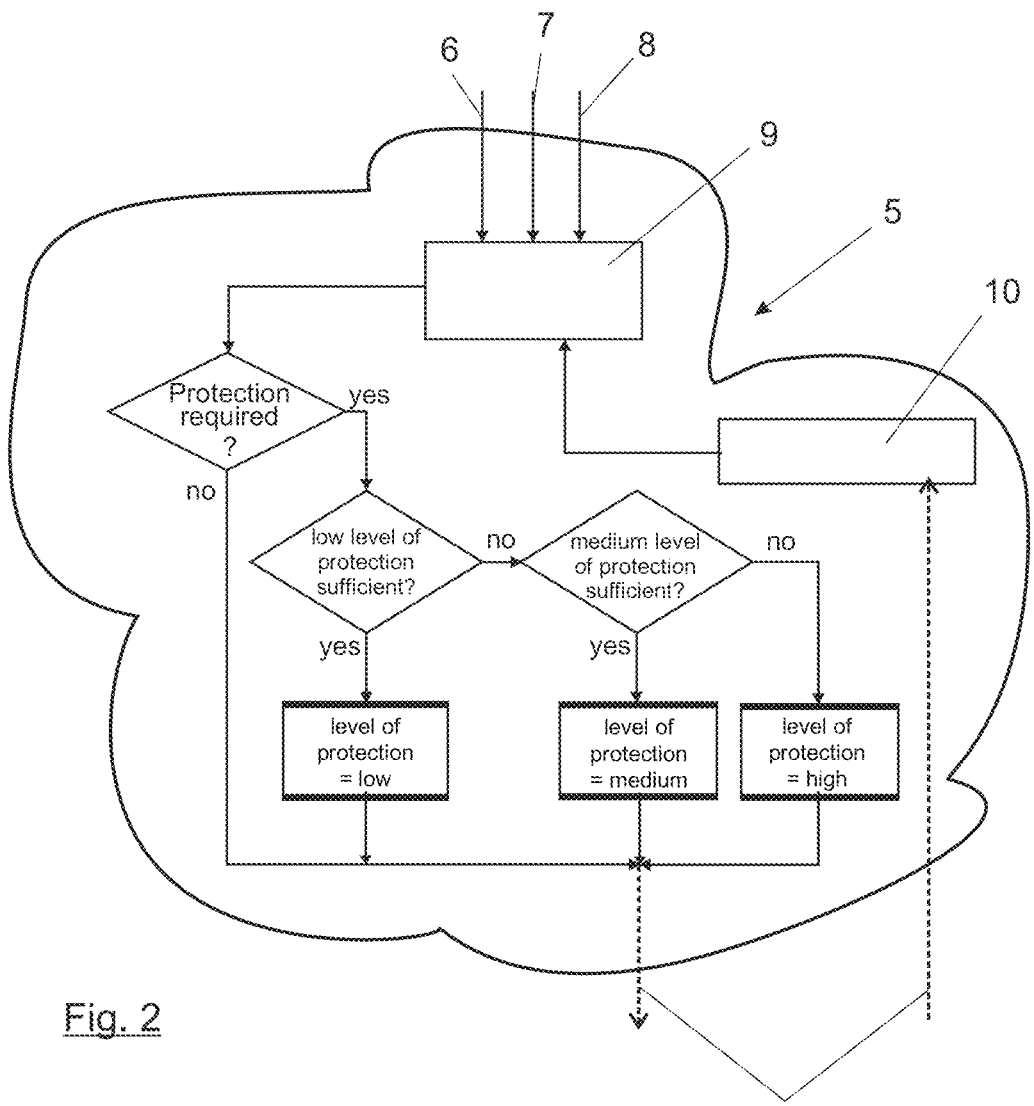

Here are shown:

FIG. 1 a schematic scenario with a vehicle and a data processing system external to the vehicle, which is here depicted by way of example as a Cloud; and FIG. 2 a schematic depiction of exemplary procedures for setting the level of protection (SN) in the data processing system external to the vehicle.

DETAILED DESCRIPTION

In the depiction of FIG. 1, a vehicle 1 can be seen in an exemplary depiction, in which vehicle different systems 2 are present that use information originating from a data processing system 5 external to the vehicle and depicted here by way of example as a Cloud via a receiver 3 and a communication connection 4. In practice, it is such that a blanket securing of the communication connection 4, as is usual with the Internet, for example via TLS (previously SSL), is typically not sufficient. Instead, the information must be secured via an end-to-end securing of the source of the information up to the system 2 in the vehicle 1 as a kind of "end consumer" of the information. Now it is known, in principle, that various integrity protection and/or encryption mechanisms are available for such securing. These are available with different levels of protection. In this context, differently strong security mechanisms with which the information is correspondingly protected are also discussed. Along with the different technical effort which cause these different levels of protection, they are also differently performant and use different amounts of resources of their terminal devices. Furthermore, it is such that they use different resources in the communication due to the different length of the transmitted messages and thus burden the communication connection 4 to different degrees which, on one hand, can limit their bandwidth and, on the other hand, is associated with the corresponding costs for the transmission of the respective information.

However, it is often such that different information is present with different levels of significance for the systems 2 in the vehicle 1. With dynamic information services such as, for example, a traffic service, notifications, and information are always present with different significance for the respective vehicle 1 or a system 2 in the vehicle 1, for example a navigation system. These can be present, for example, based on the so-called three-phase traffic theory, which Professor Boris Kerner established, with different degrees of significance. These can be notifications about free traffic, so-called synchronized traffic or a wide moving traffic jam. The free traffic is here defined in such a way that drivers of vehicles can extensively freely choose their speed. In congested traffic, this is no longer possible. In synchronized traffic, a movement extensively free of standstill, yet typically with a speed slower than the desired speed, nevertheless emerges. In a wide moving traffic jam, there are also individual stationary phases. All this can be seen in the corresponding publications and documents relating to the three-phase theory and is only of explanatory significance here.

In order to now be able to ensure such information, for example, that the information about the traffic flow or also a lot of different information, for example about construction sites, blockages, wrong-way drivers, dangerous locations, or similar, can be sufficiently protected with the protection requirement reasonable for them and, nevertheless, can be transmitted in a manner processed to save resources, a corresponding assessment is not undertaken. This prevents, on one hand, the resource consumption getting too great because unimportant information is provided with too high a level of protection, while it is, however, prevented that correspondingly critical messages are provided with too weak security mechanisms and thus would be correspondingly easy to read and, in particular, to tamper with.

Three integrity protection and/or encryption mechanisms with a low, medium, and high level of protection are again taken as a starting point by way of example below, for which reference can be made to the examples of the symmetrical integrity protection already described above and the asymmetrical integrity protection with keys of different lengths. Here, these examples are only to be understood by way of example and in a non-limiting manner.

In the depiction of FIG. 2, the central data processing system 5 formed, for example, as a Cloud and external to the vehicle is depicted again. Different information accrues to this from one or more information service providers, which come from traffic service providers, for example. This information accruing to the data processing system 5 is indicated, purely by way of example, by the arrows labeled with the reference numerals 6, 7 and 8. The information 6, 7, 8 reaches an input module 9 of the data processing system 5. There, they are combined with each other, for example, if this is necessary, and correspondingly filtered. They are further provided with corresponding parameters, which emerge either from the information, the source of the information, the potential use of the information in the vehicle 1 or also from data of the vehicle 1. Here, the vehicle 1 is in bidirectional contact with the data processing system 5 via the communication system 4, such that information coming from the vehicle can be passed along as needed to the input module via an evaluation module 10. The data reaches an indicated evaluation unit via the input module 9, in which evaluation unit it is evaluated corresponding to one of more parameters in order to establish a suitable level of protection (SN) depending on traffic phase, notification or use, with which level of projection the processing and transmission of the data via the communication connection 4 is to be carried out from the data processing system 5 to the vehicle 1 or its systems 2. As already explained above, the levels of protection are here divided into a low, a medium, and a high level of protection.

If, for example, a traffic service provider signals free traffic for the route planned via a navigation system as one of the systems 2 of the vehicle 1, then this information is not to be estimated as particularly high in terms of need for protection, since even in the event of tampering with this information, a security risk can hardly be expected. The request as to whether protection is necessary at all can thus be answered with no for such a situation, such that the information is transmitted without further mechanisms for encryption and/or for integrity protection via the communication connection 4 to the vehicle 1. Such a traffic phase of the free traffic can then be correspondingly depicted in a navigation system, for example, of the vehicle by a suitable notification, for example green coloring.

A further example would be a piece of information about a traffic phase of the synchronized traffic, which could be displayed in the vehicle with a yellow color, analogously to the statements just made. Since it has a certain influence on the arrival time and the route choice, a low level of protection, for example, can be provided with this information. The question as to whether protection is necessary would accordingly be answered with yes. The question as to whether a low level of protection is sufficient is also answered with yes. A low level of protection is then assigned to the information and, when transmitting the information via the communication path 4 from the central data processing system 5 to the vehicle 1 or its systems 2, this is correspondingly applied, for example by a symmetrical integrity protection being used with a quick hash value and common symmetrical key.

A further example would be the traffic phase of a wide moving traffic jam. Analogously to the statements already made, this could be visualized in the vehicle 1, for example via the color red. In any case, it influences the arrival time and route selection and serves as an active warning for a driver of the vehicle or for corresponding systems inside the vehicle. Accordingly, a medium level of protection would be assigned to it, i.e., for example an asymmetrical integrity protection with a short key. Thus, following the flow diagram in FIG. 2, here the question as to whether a low level of protection is sufficient would also be answered with no. Thus, a medium level of protection would, however, be sufficient, such that this is correspondingly assigned.

If such a medium level of protection is also not sufficient, which applies, in particular, for notifications and information which lead to adjusting an assistance function in the vehicle, i.e., for example when a traffic jam notification on the route can trigger a braking intervention, these would accordingly be provided with a high level of protection. Something comparable applies to information, for example, about wrong-way drivers or direct dangerous locations, such as people in the driving lane, for example, stone-throwing demonstrators on a bridge or similar. In this case, in FIG. 2 corresponding to the selection, the question as to whether a medium level of protection is sufficient would be answered with no, such that, in this case, a high level of protection is assigned and is correspondingly used for the processing and the transmission of the data via the communication path 4.

Here, a temporally-spatially delimited level of protection can be predetermined for the information, such that only the vehicles in the surroundings of, for example, 10 kilometers or a driving time of 5 minutes or less are warned of a traffic jam or a wrong-way driver, for example. The limits can here be classified, for example, by means of the events and/or by means of the position of the vehicle and/or their planned route. Furthermore, it is such that additions that can be obtained by the information providers, for example a traffic service provider, in addition to the actual information, can also be used. This can be, in particular, danger levels, which classify traffic notifications, for example, into different levels of danger. Thus, wrong-way drivers or warning notifications are categorized more highly as urgent notifications than, for example, a declaration about a traffic jam or stop-go traffic. This can also be used, in addition to many other factors, to influence how the level of protection is adjusted for the corresponding piece of information when transmitting.

Furthermore, all notifications, which are merged as information 6, 7, 8 in the central data processing system 5, can be classified in terms of the origin of the information or notification. Thus, for example, a particular level of protection cannot be set for user-generated notifications or correspondingly higher levels of protection can be implemented for notifications from particularly trustworthy communication sources.

The protection targets, i.e., what is to be ensured by the protection, can be correspondingly adapted in order to adjust the level of protection. If the information is thus to be integral, if its authenticity, its trustworthiness, its non-repudiation, or similar can be established, then this can correspondingly influence the level of protection. Of course, the information itself or its planned use can also be influenced. Moreover, a state of the vehicle, for example whether it is in a stable or unstable driving situation, can correspondingly be taken into consideration in order to adjust the level of protection for transmitting the information. Something comparable applies to the surroundings of the vehicle, which can be recorded in the direct surroundings by the vehicle or its surroundings sensors itself, or which could be ascertained from data from other vehicles and/or traffic data.

A further possibility is now the vehicle 1 or its receiving module 3 or one of its systems 2 being protected itself by all encrypted notifications signaled not corresponding to the expected specifications, i.e., all notifications that do not correspond to the expected level of protection, being discarded. In the evaluation module 10, a communication to the data processing system 5 external to the vehicle enables a statistical evaluation in the evaluation module 10, the evaluation being able to recognize potential tampering with information in the greater scope, for example in good time, and thus enabling countermeasures.

A further possibility of using the evaluation module 10 is, for example, an evaluation being carried out across all levels of protection used, which can be correspondingly stored and evaluated for all vehicles. Here, this can be analyzed, in particular, according to temporal-spatial accumulation points for the corresponding level of protection, in particular with the goal of correspondingly improving the adjustment and allocation of the level of protection and thus being able to better get by with the resources present both in the vehicle 1 and in the communication path 4 and, ultimately, also in the region of the central data processing system 5, for example of a backend server of the vehicle manufacturer.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

FIG. 2/3

| | |
|---|---|
| Schutz erforderlich? | Protection required? |
| ja | yes |
| nein | no |
| leichtes SN ausreichend? | low level of protection sufficient? |
| mittleres SN ausreichend? | medium level of protection sufficient? |
| SN = leicht | level of protection = low |
| SN = mittel | level of protection = medium |
| SN = hoch | level of protection = high |

The invention claimed is:

1. A method, comprising:
determining, by a vehicle-external data processing system, that a piece of information is to be transmitted to at least a first vehicle, wherein the piece of information relates to a particular location;
selecting, by the vehicle-external data processing system, integrity protection or encryption mechanisms for transmitting the piece of information to systems in the first vehicle using the piece of information based on at least a distance of the first vehicle relative to the particular location by comparing the distance of the first vehicle to a distance threshold; and
transmitting, by the vehicle-external data processing system, the piece of information to the first vehicle using the selected integrity protection or encryption mechanisms.

2. The method of claim 1, wherein the vehicle-external data processing system selects the integrity protection or encryption mechanisms for transmitting the piece of information further based on a speed of the first vehicle by comparing the speed of the first vehicle to a speed threshold.

3. The method of claim 2, wherein the integrity protection or encryption mechanisms are categorized as providing a low, medium and high level of protection and no level of protection, wherein the high level of protection provides more protection than the medium level of protection, and the medium level of protection provides more protection than the low level of protection.

4. The method of claim 3, wherein integrity protection or encryption mechanisms categorized as providing the high level of protection are selected for information relating to assistance functions of the first vehicle.

5. The method of claim 2, wherein the systems in the first vehicle discard all information having a level of protection that is lower than a level of protection selected for the information.

6. The method of claim 5, wherein the first vehicle transmits the discarded information to the vehicle-external data processing system.

7. The method of claim 3, wherein classifications of the piece of information are predetermined by an information provider, which are considered when selecting or adjusting the level of protection.

8. The method of claim 2, wherein levels of protection used for transmitting the piece of information and other pieces of information are stored in the vehicle-external data processing system, the method further comprising:
accumulating a distance between the particular location and locations of a plurality of additional vehicles and a speed of the additional vehicles;
adjusting the speed threshold or the distance threshold based on the accumulated distance and speed of the additional vehicles.

9. The method of claim 2, wherein the piece of information includes information of a traffic service provider.

10. The method of claim 2, further comprising:
determining, by the vehicle-external data processing system, whether to transmit a second piece of information, which is related to a second particular location, to the first vehicle based on a second speed of the first vehicle at a second point in time and a second distance of the first vehicle relative to the particular location at the second point in time by comparing the second speed of the first vehicle to a second speed threshold and comparing the second distance of the first vehicle to a second distance threshold,
wherein the speed of the first vehicle and the distance of the first vehicle relative to the particular location are determined at a first point in time that is different from the second point in time.

11. The method of claim 2, wherein the integrity protection or encryption mechanisms provide different levels of protection, wherein a higher level of protection is selected for more urgent information to be transmitted to the first vehicle than for less urgent information to be transmitted to the first vehicle.

12. The method of claim 4, wherein the assistance functions of the first vehicle directly engages in steering, accelerating, decelerating, or bringing to a standstill the first vehicle.

* * * * *